United States Patent [19]

Kannegundla et al.

[11] Patent Number: 5,210,614

[45] Date of Patent: May 11, 1993

[54] DISPLAY INTERFACE FOR HIGH RESOLUTION CCD VIDEO SENSOR

[75] Inventors: Ram Kannegundla, Rochester; Win-Chyi Chang, Penfield, both of N.Y.

[73] Assignee: Eastman Kodak Company, Rochester, N.Y.

[21] Appl. No.: 705,848

[22] Filed: May 28, 1991

[51] Int. Cl.$^5$ .................. H04N 3/14; H04N 5/335
[52] U.S. Cl. .................. 358/213.28; 358/213.27; 358/213.11
[58] Field of Search .................. 358/213.28, 213.26, 358/213.27, 213.22, 213.11

[56] References Cited

U.S. PATENT DOCUMENTS

| | | | |
|---|---|---|---|
| 3,995,107 | 11/1976 | Woywood | 178/7.1 |
| 4,593,319 | 6/1986 | Kadedodi et al. | 358/213 |
| 4,665,440 | 5/1987 | Tromborg | 358/213.29 |
| 4,679,090 | 7/1987 | Erhardt | 358/213.26 |
| 4,816,916 | 3/1989 | Akiyama | 358/213.29 |
| 4,825,301 | 4/1989 | Pape et al. | 358/213.26 |
| 4,890,165 | 12/1989 | Hasegawa | 358/213.26 |
| 4,999,717 | 3/1991 | Nagashima | 358/213.11 |

Primary Examiner—Herbert Goldstein
Assistant Examiner—Wendy R. Greening
Attorney, Agent, or Firm—Stephen C. Kaufman

[57] ABSTRACT

A low cost system for efficiently doubling the data readout rate from a high resolution CCD video sensor having two line outputs includes a pair of analog to digital converters, a separate pair of first-in first-out line stores for each of the analog to digital converters, and a digital to analog converter. Successive lines from the video sensor are fed into alternate ones of the analog to digital converters in sequence at the normal pixel clock frequency used with other than high resolution sensors. The contents of successive lines in each of the analog to digital converters are written into alternate ones of its respective pair of line stores in sequence. The contents of successive lines from all of the line stores are fed into the digital to analog converter. Finally, analog data is read out of the digital to analog converter to the single analog input of a high resolution video monitor at twice the pixel clock frequency. The entire system is made up of off-the-shelf components which are compact and relatively inexpensive.

10 Claims, 3 Drawing Sheets

DISPLAY INTERFACE FOR HIGH RESOLUTION CCD VIDEO SENSOR

FIELD OF THE INVENTION

This invention relates generally to readout interfaces for CCD (Charge Coupled Device) video sensors, and more particularly, to readout interfaces for CCD video sensors with very high degrees of resolution.

BACKGROUND OF THE INVENTION

As CCD video sensors with higher and higher degrees of resolution become available, the traditional approach has been to attempt to reduce the time required for reading out the charge in each pixel. This approach would increase the pixel readout rate (sometimes referred to as the pixel rate, the pixel clock rate, or the horizontal clock rate) and make it unnecessary to reduce the frame rate. Reducing the frame rate would have the disadvantage of introducing an undesirable flicker into moving images. Recently, however, CCD video sensors with resolutions of as high as one to four megapixels per frame have been developed and the analog technology needed for increasing the pixel rate sufficiently to avoid any reduction in the frame rate is not yet available, especially in an economically practicable form.

One possible approach to a solution of this problem is to accept a lower frame rate in reading the data from a high resolution CCD sensor into a frame store without raising the pixel rate and then to use a digital computer to avoid flicker in the reconstruction of the image on a high resolution video monitor. In such an arrangement, flicker is avoided because each frame is displayed and its image refreshed until the next frame is ready for display. A solution of this nature tends, unfortunately, to be economically impracticable not only because of the high cost of a suitable frame store, which is digital, but also because of the high cost of a digital computer. In addition, both the digital frame store and the computer tend to be bulky, a factor detracting significantly from ready portability.

Another approach to a solution uses multiple (e.g., two) outputs from a high resolution CCD video sensor. Without raising the pixel rate, such a solution reads alternate lines from each frame simultaneously into separate frame stores to create two partial images each of which has only half the lines of the original frame and has an effective frame rate of only half the desired frame rate. A digital computer is then used to blend the two partial images into a single image at the desired frame rate prior to application to a single input high resolution video monitor. This solution, like the one described previously, tends to be economically impracticable because of the high costs of both the frame store and the digital computer and to be undesirably bulky.

It is desirable, therefore, to find an economically feasible and physically compact way to read out the charge in all pixels per frame in a high resolution CCD video sensor without either increasing the pixel rate or decreasing the frame rate in the final display and without using expensive frame stores and digital computers.

SUMMARY OF THE INVENTION

The present invention solves the problem of reading out the charge in all pixels per frame in a high resolution CCD video sensor without requiring either an increase in the pixel rate or a decrease in the frame rate. The invention does so, moreover, by taking advantage of high resolution CCD video sensors with multiple outputs, using readily available and relatively inexpensive digital component circuitry, to drive a high resolution video monitor having only a single analog input.

In accordance with one aspect of the invention, the data readout rate from a high resolution CCD video sensor with two outputs is doubled with the aid of a pair of analog to digital converters, a separate pair of first-in first-out line stores for each of the analog to digital converters, and a digital to analog converter. In accordance with this aspect of the invention, the pixels of successive lines from the video sensor are read from alternate outputs and fed into respectively different analog to digital converters in sequence at a normal pixel clock frequency, the contents of successive lines in each of the analog to digital converters are read into alternate ones of its respective pair of line stores in sequence, the contents of successive lines from all of the line stores are read into the digital to analog converter in sequence, and analog data are read out of the digital to analog converter at twice the pixel clock frequency. Technology for this final high speed readout from a digital to analog converter is readily available and the line stores, although digital, are of relatively low capacity and hence inexpensive. The analog data thus supplied to the single input of a high resolution video monitor from the digital to analog converter are identical to the data that would have been supplied had it been possible to read them out of a single output of the CCD video sensor directly at the doubled pixel clock frequency.

A particular advantage of the above aspect of the invention is that all of the interface components required, whether analog or digital, are compact and readily available commercially at relatively low cost. Any need to use bulky and expensive high capacity digital frame stores and digital computers is entirely avoided.

In accordance with another and more comprehensive aspect of the invention, the data readout rate from a high resolution CCD video sensor with n outputs, where n is an integer greater than one, is increased by a factor of n with the aid of n analog to digital converters, a separate pair of first-in first-out line stores for each of the analog to digital converters, and a digital to analog converter. In accordance with this aspect of the invention, the pixels of successive lines from the video sensor are read from successively repetitive ones of the n outputs and fed into respectively different analog to digital converters in sequence at a pixel clock frequency, the contents of successive lines in each of the analog to digital converters are read into alternate ones of its respective pair of line stores in sequence, the contents of successive lines from all of the line stores are read into the digital to analog converter in sequence, and analog data are read out of the digital to analog converter at n times the pixel clock frequency. This final high speed readout too can be accomplished with available present day technology. The analog data thus supplied to the single input of a high resolution video monitor from the digital to analog converter are identical to the data that would have been supplied had it been possible to read them out of the CCD video sensor directly at n times the pixel clock frequency.

An advantage of this aspect of the invention as well is that all of the interface components required are compact and readily available commercially at relatively low cost. Any need to use bulky and expensive high capacity digital frame stores and digital computers is, once again, entirely avoided.

From another point of view, this broader aspect of the invention is directed to a system for increasing the data readout rate from a multiple output high resolution CCD video sensor by a factor of n, where n is an integer greater than one equal to the number of outputs. The system comprises n analog to digital converters, a separate pair of first-in first-out line stores, a digital to analog converter, and means for reading analog data out of said digital to analog converter. The n analog to digital converters are connected to receive the pixels of successive lines from the video sensor into successively repetitive ones of the analog to digital converters in sequence at a predetermined pixel clock frequency. The separate pair of first-in first-out line stores for each of the analog to digital converters is connected to receive the contents of successive lines in each of the analog to digital converters in alternate ones of its respective pair of line stores in sequence. The digital to analog converter is connected to receive the contents of successive lines from all of the line stores into the digital to analog converter in sequence. The means for reading analog data out of the digital to analog converter operates at n times the pixel clock frequency.

The invention will be better understood from the following detailed description of specific embodiments, taken in the light of the accompanying drawing and the appended claims.

DETAILED DESCRIPTION

Figure 1:
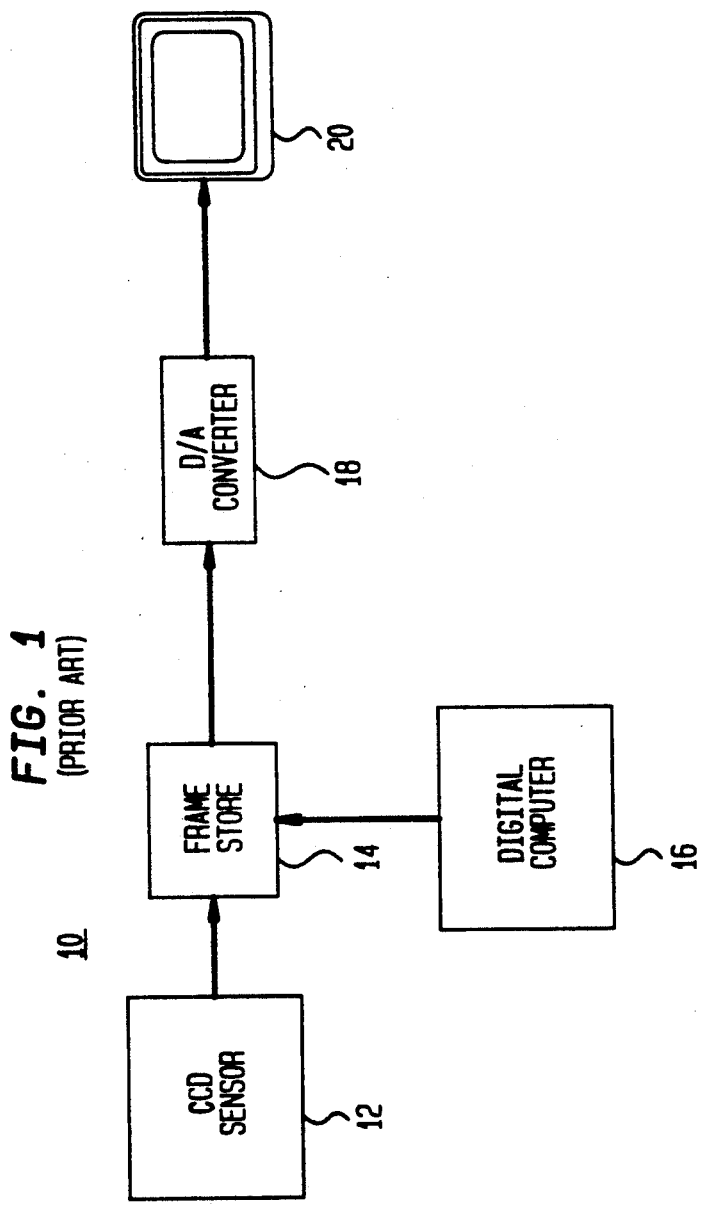
FIG. 1 is a block diagram of a prior art system for reading out data from a high resolution CCD video sensor.

FIG. 1 shows a prior art system 10 which allows for increasing the data readout rate from a high resolution CCD video sensor with a single output. System 10 succeeds in effectively doubling the data readout rate and includes a high resolution CCD video sensor 12, a digital frame store 14, a digital computer 16, a digital to analog (D/A) converter 18, and a high resolution video monitor 20.

The output from high resolution CCD video sensor 12 is supplied to frame store 14, while the output from frame store 14 is controlled by computer 16 and supplied to high resolution monitor 20 through digital to analog (D/A) converter 18. In system 10, each frame from CCD video sensor 12 is read into frame store 14 in sequence, using a normal pixel clock frequency and a slow enough frame rate to accommodate the process (e.g., half the normal frame rate). The contents of the frame are stored digitally and supplied through converter 18 to monitor 20. Computer 16 operates to maintain the video image of each frame on video monitor 20 at a rate of at least thirty frames per second until the next frame is ready. In this manner, flicker is avoided even though the frame rate is only half the normal rate.

In an alternative approach, sensor 12 in system 10 is provided with two outputs (not shown). A larger number of outputs may be used, if desired, but the principle remains the same. In such an arrangement, alternate lines from each frame are read simultaneously into frame store 14 (which consists of two separate internal frame stores—not shown) to form two partial images, each of which has only half the lines of the original frame and has an effective individual frame rate of only half the normal frame rate. The contents of each successive set of partial frames are stored digitally within frame store 14 in its two internal frame stores before being blended into a single image at the normal frame rate by computer 16. The blended image is then supplied through converter 18 to the single input of monitor 20. Flicker is avoided because the normal frame rate is maintained in the signal supplied to monitor 20.

The major problem with system 10 using either approach is that both high capacity digital frame stores and digital computers tend not only to be relatively expensive but also bulky. For these reasons, system 10 tends both to be too costly for many applications and too large for ready portability.

Figure 2:
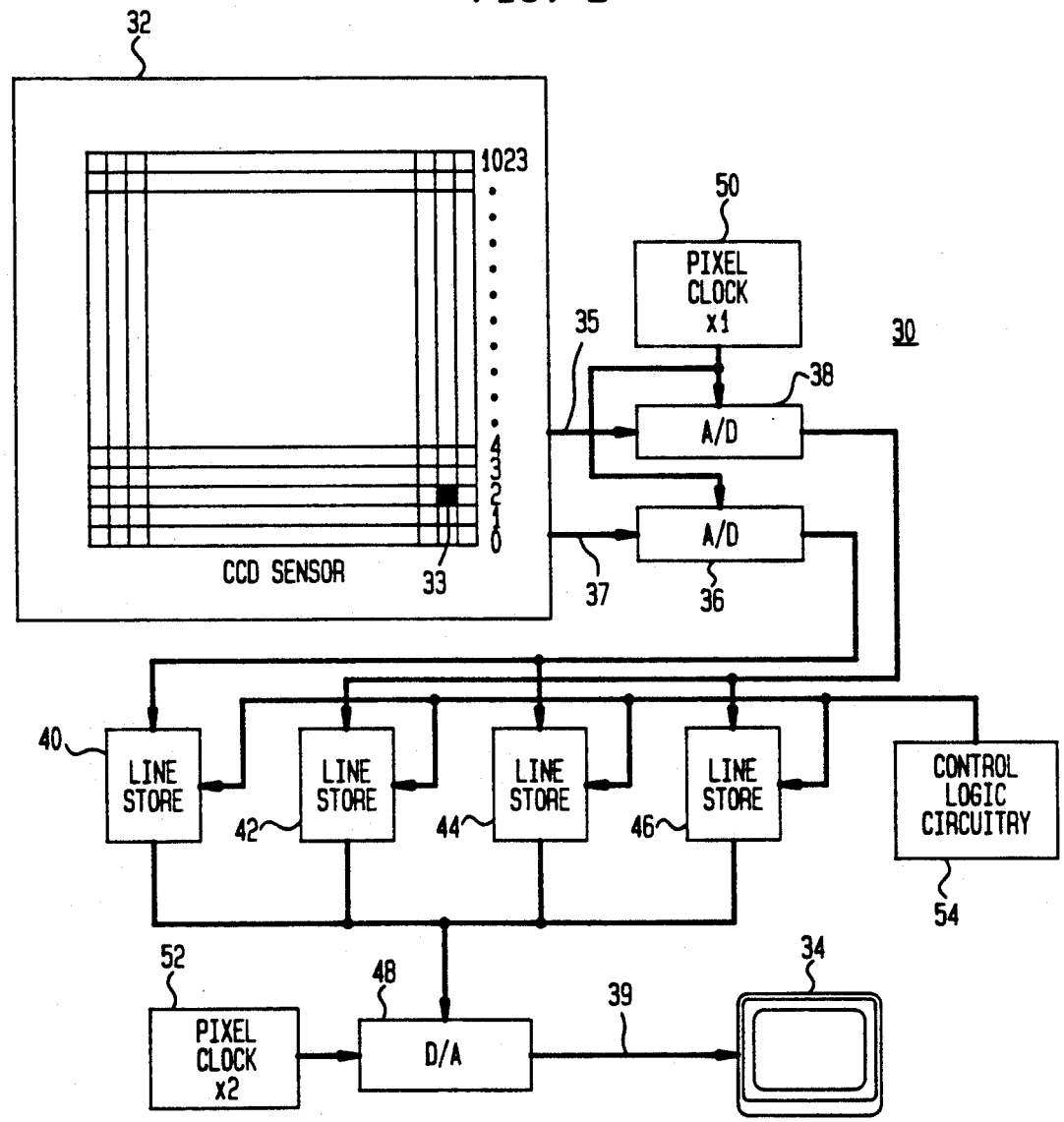
FIG. 2 is a block diagram of a system in accordance with the present invention which doubles the effective data readout rate from a high resolution CCD video sensor with two outputs.

Referring now to FIG. 2, there is shown a system 30 which is in accordance with the present invention and which solves the above described problem in a much more economical manner than system 10 of FIG. 1. The system 30 comprises a high resolution CCD video sensor 32 having two parallel line outputs 35 and 37, a high resolution video monitor 34 having only a single input 39, two analog to digital (A/D) converters 36 and 38, four first-in first-out line stores 40, 42, 44, and 46, a digital to analog (D/A) converter 48, a pixel clock 50 operating at a normal pixel frequency ($\times 1$), a pixel clock 52 operating at twice ($\times 2$) the frequency of pixel clock 50, and control logic circuitry 54. Pixel clocks 50 and 52 both operate control logic circuitry 54, the former to control the writing of data into and the latter to control the reading of data out of line stores 40, 42, 44, and 46.

Pixel clocks 50 and 52 and control logic circuitry 54 may, of course, all constitute a single logic circuit if desired. Line stores 40, 42, 44, and 46 are semiconductor parallel first-in first-out memory circuits which load and empty data on a first-in first-out basis. Each line store has a 1024 by 9 organization to allow for a 1024 deep word structure and has tri-state buffers at both input and output ends to permit common input and common output buses. Analog to digital (A/D) converters 36 and 38 both 10 bit monolithic converters capable of sufficiently high word rates to accommodate the pixel rate established by pixel clock 50. Digital to analog (D/A) converter 48 is a 10 bit monolithic converter capable of sufficiently high word rates to accommodate the doubled pixel rate established by pixel clock 52.

CCD video sensor 32 is shown, by way of example, as having 1024 pixels per line and 1024 lines per frame, where every frame defines a complete picture. Beginning at the bottom of a picture, lines are numbered consecutively from 0 through 1023. A single pixel 33 is shown, also by way of example, as a darkened square in line 2. In reality, each pixel is an analog signal, the magnitude of which is a measure of light falling on the pixel on a scale which has white as the maximum and black as the minimum. Included within video sensor 32 are two analog shift registers (not shown), each 1024 pixels wide, which contain the respective contents of alternate pairs of lines, beginning at the bottom of the picture. These two analog shift registers provide first and second parallel line outputs 35 and 37 of video sensor 32.

The first line output 35 from video sensor 32 is connected to the input of analog to digital (A/D) converter 36, while the second line output 37 is connected to the input of analog to digital (A/D) converter 38. Each of analog to digital (A/D) converters 36 and 38 is associated with its own pair of first-in first-out line stores which, although digital, are inexpensive because of their relatively low storage capacity. The output of analog to digital (A/D) converter 36 is supplied to the respective inputs of line stores 40 and 44, while that of analog to digital (A/D) converter 38 is supplied to the respective inputs of line stores 42 and 46. The outputs of all four line stores 40, 42, 44, and 46 are supplied to the input of digital to analog (D/A) converter 48. Finally, the output of digital to analog (D/A) converter 48 is supplied to the single input of high resolution video monitor 34. Pixel clock 50 is connected to control analog to digital (A/D) converters 36 and 38 and pixel clock 52, operating at twice the frequency of pixel clock 50, is connected to control digital to analog (D/A) converter 48. Control logic circuitry 54 is coupled to all four line stores 40, 42, 44, and 46 and controls their read, write, and reset functions. Data are written into line stores 40, 42, 44, and 46 at the pixel clock rate, while data are read out of them at twice the pixel clock rate.

System 30 reads the pixels of successive lines from video sensor 32 into alternate ones of analog to digital (A/D) converters 36 and 38 at a pixel frequency determined by pixel clock 50. Thus, the pixels of line 0 are read into converter 36 while the pixels of line 1 are read simultaneously into converter 38. Then the pixels of line 2 are read into converter 36 while the pixels of line 3 are read simultaneously into converter 38, and so on, all at the pixel frequency. The pixel frequency, which determines the rate at which the individual pixels in each line are read into the respective analog to digital (A/D) converter, is the normal pixel frequency used for reading the pixel contents of other than high resolution CCD video sensors.

Under the control of control logic circuitry 54, the contents of successive lines in analog to digital (A/D) converters 36 and 38 are written into alternate line stores in sequence. Thus, converted line 0 from converter 36 is written into line store 40, converted line 1 from converter 38 is written into line store 42, converted line 2 from converter 36 is written into line store 44, converted line 3 from converter 38 is written into line store 46, converted line 4 from converter 36 is written into line store 40, and so on. In this manner, the availability of the lines at the respective outputs of line stores 40, 42, 44, and 46 is in the sequence 0, 1, 2, 3, 4, and so on. This is exactly the sequence needed for reproduction of the picture they represent.

The respective lines at the outputs of line stores 40, 42, 44, and 46 are read into digital to analog (D/A) converter 48 in sequence. Under the control of pixel clock 52, which runs at twice the frequency ($\times 2$) of pixel clock 50, the reconstructed analog pixels are read into input 39 of high resolution video monitor 34. The result is a high resolution picture which takes full advantage of the resolution of CCD video sensor 32 with no sacrifice in frame rate. All components are readily available commercially at minimal cost.

Figure 3:
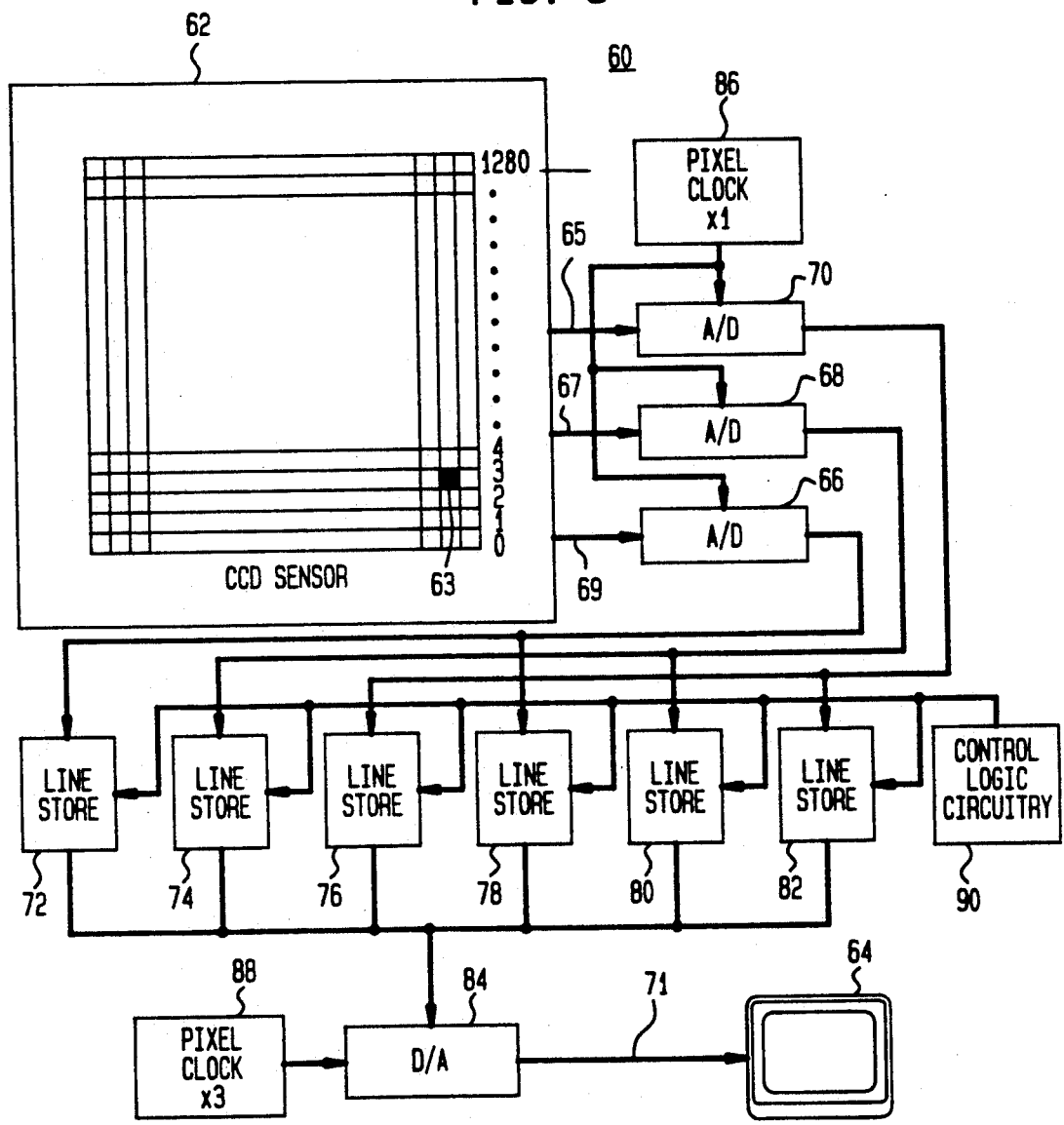
FIG. 3 is a block diagram of another system in accordance with the present invention which triples the effective data readout rate from a high resolution CCD video sensor with three outputs.

Referring now to FIG. 3, there is shown a system 60 which is in accordance with the present invention and which increases the data readout rate from a high resolution CCD video sensor by integral factors greater than 2 such as, for example, 3. System 60 comprises a high resolution CCD video sensor 62 with three parallel line outputs 65, 67, and 69, a high resolution video monitor 64 having only a single analog input 71, three analog to digital (A/D) converters 66, 68, and 70, six first-in first-out line stores 72, 74, 76, 78, 80, and 82, a digital to analog (D/A) converter 84, a pixel clock 86 which operates at a normal pixel frequency ($\times 1$), a pixel clock 88 which operates at three times ($\times 3$) the frequency of pixel clock 86, and control logic circuitry 90. Pixel clocks 86 and 88 both operate control logic circuitry 90, the former to control the writing of data into and the latter to control the reading of data out of line stores 72, 74, 76, 78, 80, and 82.

Pixel clocks 86 and 88 and control logic circuitry 90 may, of course, all constitute a single logic package if desired. Line stores 72, 74, 76, 78, 80, and 82 are silicon parallel first-in first-out memory circuits which load and empty data on a first-in first-out basis. Each line store has a 1024 by 9 organization to allow for a 1024 deep word structure and has tri-state buffers at both input and output ends to permit common input and common output buses. Analog to digital (A/D) converters 66, 68, and 70 are all 10 bit monolithic converters capable of sufficiently high word rates to accommodate the pixel rate established by pixel clock 86. Digital to analog (D/A) converter 84 is a 10 bit monolithic converter capable of sufficiently high word rates to accommodate the trebled pixel rate established by pixel clock 88.

CCD video sensor 62 is shown as having, again by way of example, 1024 pixels per line and 1281 lines per frame. Beginning at the bottom of the picture, lines are numbered consecutively from 0 through 1280. A single pixel 63 is shown, also by way of example, as a darkened square in line 3. In reality, each pixel is an analog signal, the magnitude of which is a measure of darkness on a scale which has white as the maximum and black as the minimum. Included within video sensor 62 are three analog shift registers (not shown), each 1280 pixels wide, each of which contains, in sequence, the respective contents of every third line, beginning at the bottom of the picture. These three analog shift registers provide the three parallel line outputs 65, 67, and 69 of video sensor 62.

The first output 65 from video sensor 62 is supplied to analog to digital (A/D) converter 66, the second output 67 is supplied to analog to digital (A/D) converter 68, and the third output 69 is supplied to analog to digital (A/D) converter 70, all substantially simultaneously. Each of analog to digital (A/D) converters 66, 68, and 70 is associated with its own pair of first-in first-out line stores. The output of analog to digital (A/D) converter 66 is supplied to the respective inputs of line stores 72 and 78, the output of analog to digital (A/D) converter 68 is supplied to the respective inputs of line stores 74 and 80, and the output of analog to digital (A/D) converter 70 is suppled to the respective inputs of line stores 76 and 82. The outputs of all six line stores 72, 74, 76, 78, 80, and 82 are supplied to the input of digital to analog (D/A) converter 84. Finally, the output of digital to analog (D/A) converter 84 is supplied to high resolution video monitor 64. Pixel clock 86 is connected to control analog to digital (A/D) converters 66, 68, and 70 and pixel clock 88, operating at three times (×3) the frequency of pixel clock 86, controls digital to analog (D/A) converter 84. Control logic circuitry 90 is coupled to all six line stores 72, 74, 76, 78, 80, and 82 to control their read, write, and reset functions.

In operation, system 60 reads the pixels of successive lines from video sensor 62 into successive ones of analog to digital (A/D) converters 66, 68, and 70 in sequence at a pixel frequency determined by pixel clock 86. Thus, the pixels of line 0 are first read into converter 66, the pixels of line 1 are then read into converter 68, the pixels of line 2 are then read into converter 70, the pixels of line 3 are then read into converter 66, and so on. The pixel frequency, which determines the rate at which the individual pixels in each line are read into the respective analog to digital (A/D) converter, is once again the normal pixel frequency used with other than high resolution CCD video sensors.

Under the control of control logic circuitry 90, the contents of successive lines in analog to digital (A/D) converters 66, 68, and 70 are read into successively repetitive line stores in sequence. Thus, converted line 0 from converter 66 is first read into line store 72, converted line 1 from converter 68 is then read into line store 74, converted line 2 from converter 70 is then read into line store 76, converted line 3 from converter 66 is then read into line store 78, converted line 4 from converter 68 is then read into line store 80, converted line 5 from converter 70 is then read into line store 82, converted line 6 from converter 66 is then read into line store 72, and so on. In this manner, the availability of the lines at the respective outputs of line stores 72, 74, 76, 78, 80, and 82 is in the sequence 0, 1, 2, 3, 4, 5, 6, and so on. This, once again, is exactly the sequence needed for reproduction of the picture they represent.

The respective lines at the outputs of the six line stores are fed into digital to analog (D/A) converter 84 in sequence. Under the control of pixel clock 88, which runs at three times (×3) the frequency of pixel clock 86, the reconstructed analog pixels are read into the single input 71 of high resolution video monitor 64. The result is a high resolution picture which takes full advantage of the resolution of CCD video sensor 62 with no sacrifice in frame rate. All components are readily available commercially at low cost. As will readily be seen, the general rule according to the invention in its various aspects is to use n analog to digital converters, where n is an integer greater than one, to use 2n line stores, and to read analog data out of the digital to analog (D/A) converter at n times the pixel clock frequency.

About the only limit at present to increasing the effective pixel readout rate in the manner shown in FIG. 3 is found in the requirement that, as n increases, the number of line stores required increases by 2n and the required operating frequency range of the line stores increases by n. First-in first-out low capacity digital line stores are relatively inexpensive, though, so the limit tends not to become significant for relatively low values of the integer n.

It is to be understood that the embodiments of the invention which have been described are illustrative. Numerous other arrangements and modifications may be readily devised by those skilled in the art without departing from the spirit and scope of the invention.

What is claimed is:

1. A system for increasing the data readout rate from a high resolution CCD video sensor by a factor of n, where n is an integer greater than one and said video sensor produces a sequence of frames, each frame comprising a multiplicity of lines of pixels, said system comprising:
   n analog to digital converters connected to said video sensor to receive the pixels of successive lines in each frame from said video sensor into sequential ones of said analog to digital converters at a predetermined pixel clock frequency;
   a separate pair of first-in first-out line stores for each of said analog to digital converters connected to respective ones of said analog to digital converters to receive the contents of successive lines in each of said analog to digital converters in alternate ones of its respective pair of line stores in sequence;
   a digital to analog converter connected to all of said line stores to receive the contents of successive lines from all of said line stores into said digital to analog converter in sequence; and
   means connected to said digital to analog converter for reading analog data out of said digital to analog converter at n times said pixel clock frequency.

2. The system of claim 1 in which said high resolution CCD video sensor has n separate line outputs and in which each successive n lines from a frame produced by said video sensor are received substantially concurrently by said analog to digital converters.

3. The system of claim 2 for increasing the data readout rate from a high resolution CCD video sensor by a factor of n which includes a high resolution video monitor having a single analog input and in which said means for reading analog data out of said digital to analog converter comprises means for reading analog data out of said digital to analog converter and supplying it to said input of said high resolution video monitor at n times said pixel clock frequency.

4. The system of claim 3 for increasing the data readout rate from a high resolution CCD video sensor by a factor of n in which each of said analog to digital converters is a multibit monolithic semiconductor converter.

5. The system of claim 3 for increasing the data readout rate from a high resolution CCD video sensor by a factor of n in which each of said first-in first-out line stores is a parallel silicon memory unit.

6. A system for doubling the data readout rate from a high resolution CCD video sensor which produces a sequence of frames, each frame comprising a multiplicity of lines of pixels, said system comprising:
   a pair of analog to digital converters connected to said video sensor to receive the pixels of successive lines in each frame from said video sensor into alternate ones of said analog to digital converters in sequence at a predetermined pixel clock frequency;
   a separate pair of first-in first-out line stores for each of said analog to digital converters connected to respective ones of said analog to digital converters to receive the contents of successive lines in each of said analog to digital converters in alternate ones of its respective pair of line stores in sequence;
   a digital to analog converter connected to all of said line stores to receive the contents of successive lines from all of said line stores in sequence; and
   means connected to said digital to analog converter for reading analog data from said digital to analog converter out at twice said pixel clock frequency.

7. The system of claim 6 in which said high resolution CCD video sensor has two separate line outputs and in which each successive two lines from a frame produced by said video sensor are received substantially concurrently by said analog to digital converters.

8. The system of claim 7 for doubling the data readout rate from a high resolution CCD video sensor which includes a high resolution video monitor having a single analog input and in which said means for reading analog data out of said digital to analog converter comprises means for reading analog data out of said digital to analog converter and supplying it to said high resolution video monitor at twice said pixel clock frequency.

9. The system of claim 8 for doubling the data readout rate from a high resolution CCD video sensor in which each of said analog to digital converters is a multibit monolithic semiconductor converter.

10. The system of claim 8 for doubling the data readout rate from a high resolution CCD video sensor in which each of said first-in first-out line stores is a silicon parallel memory unit.

* * * * *